United States Patent
Wu et al.

(10) Patent No.: US 9,856,028 B2
(45) Date of Patent: *Jan. 2, 2018

(54) INTEGRATED PYLON STRUCTURE FOR PROPULSION SYSTEM

(71) Applicants: COMMERCIAL AIRCRAFT CORPORATION OF CHINA, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN)

(72) Inventors: Guanghui Wu, Shanghai (CN); Kecen Han, Shanghai (CN); Liangdao Zhou, Shanghai (CN); Qifeng Yu, Shanghai (CN); Guozheng Lin, Shanghai (CN); Hongjie Zhang, Shanghai (CN); Shibiao Zhang, Shanghai (CN); Haojie Weng, Shanghai (CN); Haisha Guo, Shanghai (CN); Pengfei Zhang, Shanghai (CN); Xiaonan Li, Shanghai (CN); Shiwei Ma, Shanghai (CN); Yinyin Hu, Shanghai (CN); Sen Peng, Shanghai (CN); Honggang Tang, Shanghai (CN); Mingpeng Yan, Shanghai (CN)

(73) Assignees: Commercial Aircraft Corporation of China, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/407,497

(22) PCT Filed: Dec. 12, 2013

(86) PCT No.: PCT/CN2013/089256
§ 371 (c)(1),
(2) Date: Dec. 12, 2014

(87) PCT Pub. No.: WO2014/121638
PCT Pub. Date: Aug. 14, 2014

(65) Prior Publication Data
US 2015/0122943 A1 May 7, 2015

(30) Foreign Application Priority Data
Feb. 6, 2013 (CN) .......................... 2013 1 0048319

(51) Int. Cl.
*B64D 27/26* (2006.01)
*F02K 1/72* (2006.01)
*B64D 27/18* (2006.01)

(52) U.S. Cl.
CPC ............ *B64D 27/26* (2013.01); *B64D 27/18* (2013.01); *F02K 1/72* (2013.01);
(Continued)

(58) Field of Classification Search
CPC .. B64D 29/06; B64D 27/26; B64D 2027/262; B64D 2027/264; F02K 1/72; F02K 1/68; F02K 1/70
See application file for complete search history.

(56) References Cited

U.S. PATENT DOCUMENTS 5,620,154 A * 4/1997 Hey ..................... B64D 27/18
244/54
6,330,995 B1 * 12/2001 Mangeiga ............. B64D 27/26
244/54
(Continued)

FOREIGN PATENT DOCUMENTS

CN 100519340 C 7/2009
CN 101678898 A 3/2010
(Continued)

OTHER PUBLICATIONS

International Search Report, dated Mar. 20, 2014.
(Continued)

*Primary Examiner* — Joseph W Sanderson
*Assistant Examiner* — Christopher Hutchens
(74) *Attorney, Agent, or Firm* — Hamilton, Brook, Smith & Reynolds, P.C.

(57) ABSTRACT

An integrated pylon structure for a propulsion system is suitable for one end to be connected to an aircraft wing and the other end to be connected to an aircraft engine. The pylon structure includes a pylon box section (110) formed
(Continued)

from an upper and a lower bean, a frame (100) and a side wall panel. The pylon structure has a thrust reverser hood connection structure, provided on the side wall and connected with a nacelle thrust reverser hood having a front fixed hood (301) and a rear movable hood (302). A guide rail allows the rear movable hood to slide and open relative to the pylon box section. The engine thrust reverser hood is directly connected to the side wall of the pylon box section and a guide rail on the side wall guides the opening of the thrust reverser hood.

9 Claims, 10 Drawing Sheets

(52) U.S. Cl.
CPC ......... *B64D 2027/264* (2013.01); *Y02T 50/44* (2013.01); *Y02T 50/672* (2013.01)

(56) References Cited

U.S. PATENT DOCUMENTS

| | | | |
|---|---|---|---|
| 2007/0138337 A1* | 6/2007 | Audart-Noel | B64D 27/26 244/53 R |
| 2009/0064658 A1* | 3/2009 | Beutin | F02K 1/34 60/226.2 |
| 2011/0023450 A1* | 2/2011 | Stuart | F02K 1/72 60/226.2 |
| 2011/0062279 A1 | 3/2011 | Welch et al. | |
| 2013/0156574 A1* | 6/2013 | Antunes | F01D 21/045 415/229 |
| 2015/0166188 A1 | 6/2015 | Lin et al. | |

FOREIGN PATENT DOCUMENTS

| | | |
|---|---|---|
| CN | 101801788 | 8/2010 |
| CN | 102076563 | 5/2011 |
| CN | 102630272 A | 8/2012 |
| CN | 103101628 | 5/2013 |
| CN | 103112595 | 5/2013 |
| CN | 103112595 A | 5/2013 |
| FR | 2891244 | 3/2007 |

OTHER PUBLICATIONS

International Search Report for PCT/CN 2013/089256, entitled: Front Installation Node Integrated With Aircraft Pylon, dated Mar. 6, 2014. (Not in English).
Non-Final Office Action for U.S. Office Action U.S. Appl. No. 14/407,545, entitled: Front Installation Node Integrated With Aircraft Pylon, dated Mar. 17, 2016.
Final Office Action for U.S Office Action U.S. Appl. No. 14/407,545, entitled Front Installation Node Integrated With Aircraft Pylon, dated Oct. 6, 2016.
Notice of Allowance dated Jan. 31, 2017, issued in U.S. Appl. No. 14/407,545; Title: Front Installation Node Integrated with Aircraft Pylon.
Notice of Allowance dated May 12, 2017, issued in U.S. Appl. No. 14/407,545; Title: Front Installation Node Integrated with Aircraft Pylon.

* cited by examiner

ÏNTEGRATED PYLON STRUCTURE FOR PROPULSION SYSTEM

FIELD OF THE INVENTION

The present invention generally relates to the technical field of structural design, general design, aerodynamic design and strength design of civil aircrafts, and more specifically to a structural connection form of a pylon with an airfoil and an engine.

BACKGROUND OF THE INVENTION

A pylon is a connection interface of an aero-engine and an airfoil and mainly functions to mount the engine, transfer engine load, provide a pathway for systems such as a wiring system, environment control system, electrical system and hydraulic system between the engine and the airfoil, and ensure a smooth aerodynamic shape. The design of the pylon structure should take into account various factors such as noise, weight, fuel consumption rate, aerodynamics, system deployment, and engine installation and maintenance.

As shown in FIG. 1, a pylon 10' in a conventional configuration is usually designed as a rigid box-shaped structure consisting of an upper beam, a lower beam, a frame having a plurality of vertical stations, and a sidewall which are connected to one another, and assembled with the engine via a front installation joint 20' and a rear installation joint 30'. The total load of the engine is transferred via the front installation joint and the rear installation joint, and torque is usually transmitted by virtue of the rear installation joint 30'.

The pylon in the conventional configuration transmits torque via the rear installation joint 30'. To have an enough long arm of force to transmit torque, the rear installation joint 30' must have a larger width, which causes the shape of a rear edge of the pylon wider, affecting aerodynamic performance of the aircraft. Besides, the front installation joint 20' is an individual component independent from the pylon but connected to the pylon, and the whole engine installation structure is heavy.

The conventional pylon is hingedly connected to a nacelle. As shown in FIG. 2, a pylon sidewall 11' is provided with thrust reverser cowl hinges 12' and fan cowl hinges 13', wherein the thrust reverser cowl hinges 12' are connected with a thrust reverser cowl body (not shown) via a guide rail beam (not shown), and the guide rail beam is provided with a guide rail for guiding the thrust reverser cowl body.

A conventional aircraft engine duct auxiliary structure for rectifying external ducted airflow is located between a nacelle external duct and a nacelle core cowl body and is connected together with the nacelle core cowl body, and is opened along with the core cowl body upon servicing. It can be seen that the conventional engine duct auxiliary structure is a design integral with the nacelle and turns out to be a component of the nacelle.

SUMMARY OF THE INVENTION

A first object of the present invention is to provide a novel connection form of connecting a pylon to an airfoil and an engine, which can meet structural needs of small space and achieve weight reduction when an LEAP-X model engine is used.

A second object of the present invention is to provide a novel connection form of connecting a pylon to an airfoil and an engine, which omits rearward torque transmission and performs forward torque transmission, thereby reducing an engine duct space occupied by the pylon, reasonably solving issue about load transmission of the engine, and thereby achieving reduction of fuel consumption rate, reduction of aerodynamic loss and noise reduction.

A third object of the present invention is to provide a novel connection form of connecting a pylon to an airfoil and an engine, which solves issue about movement of a rear cowl of a core cowl of an engine nacelle.

According to one aspect of the present invention, there is provided a pylon structure of an integrated propulsion system, which is adapted to be connected to an aircraft airfoil at one end and connected to an aero-engine at the other end, the pylon structure comprising a pylon box segment consisting of an upper beam, a lower beam, a frame and a sidewall panel, wherein the pylon structure further comprises:

a thrust reverser cowl connection structure disposed on a left wall and a right wall and connected to a nacelle thrust reverser cowl comprising a front fixed cowl and a rear moveable cowl, the thrust reverser cowl connection structure comprising at least one guide rail for guiding the rear moveable cowl to enable the rear moveable cowl to slideably open relative to the pylon box segment.

In this aspect of the present invention, the engine thrust reverser cowl is directly connected to a sidewall of the pylon box segment, and the thrust reverser cowl is guided to open via the guide rail on the sidewall, thus a guide rail beam is canceled to thereby not only save space and meet the installation requirement of the LEAP-X model engine, but also reduce the weight of the whole propulsion system.

Preferably, the thrust reverser cowl connection structure comprises an upper guide rail and a lower guide rail for guiding the rear movable cowl, and an intermediate guide rail for guiding a nacelle grid.

Further preferably, the rear movable cowl is provided with a structure slideably engaged with the upper guide rail and the lower guide rail.

In an embodiment, the pylon structure further comprises a front installation joint which is disposed on a front wall of the front end frame of the frame and connected to a fan casing of the aero-engine.

Integrated design of the front installation joint and the pylon may not only save space but also facilitate reduction of the weight of the whole propulsion system.

Preferably, the front installation joint comprises:
a first lug and a second lug respectively protruding outward from two opposite sides of the front end frame;
a first link and a second link respectively connected to the first lug and the second lug at one end, and respectively adapted to be connected to the aero-engine at the other end;
wherein the first link and the first lug are pivotally connected at a first connection point, and the second link and the second lug are connected respectively at a second connection point and a third connection point.

In this aspect of the present invention, the integrated design of the front installation joint and the frame of the pylon can transmit vertical and lateral load as well as torque, overcomes the drawback of the current front installation joint about failure to transmit torque, releases the torque-transmitting function of the rear installation joint so as to reduce the width of the rear installation joint so that the rear installation joint occupies less engine duct space, which facilitates reduction of fuel consumption rate, facilitates retraction of a rear edge of the pylon and achieves reduction of aerodynamic loss. Meanwhile, the integrated design of the front installation joint and the frame of the pylon may effectively reduce the weight of the structure and lower a height of an undercarriage.

Preferably, connecting bolts running through the first link and the second link respectively at the first connection point, the second connection point and the third connection point are transition-fitted with bushings disposed at these connection points and formed in mounting holes of the first lug and the second lug.

Further preferably, the first link is further connected to the first lug at a fourth connection point, and the fourth connection point and the second connection point are arranged opposite to each other and respectively located inside, the first connection point and the third connection point, wherein a connecting bolt running through the first link at the fourth connection point is clearance-fitted with the bushing disposed in the mounting hole of the first lug at the fourth connection point.

The fourth connection point is arranged such that when the front installation joint is connected to the engine via the first link and the second link, the first link is a standby design for possible damages and security purpose.

Again further preferably, the connecting bolt at the fourth connection point is clearance-fitted with the bushing with a first clearance, and the first clearance is set in a way that when any one of the first connection point, the second connection point and the third connection point fails, the connecting bolt at the fourth connection point partially contacts with the bushing.

When any one of the first connection point, the second connection point and the third connection point fails, for example, when the second connection point fails, due to the load of the engine, a front end frame of the pylon slightly rotates about the third connection point, and the first clearance at the fourth connection point partially disappears, i.e., the fourth connection point participates in receiving a force.

Preferably, the front installation joint of the present invention further comprises a third lug protruding outward from a front wall of the front end frame and a third link having one end connected to the third lug at a fifth connection point and the other end adapted to be connected to the engine, and a connecting bolt running through the third link at the fifth connection point is clearance-fitted with a busing disposed in a mounting hole of the third lug at the fifth connection point.

The fifth connection point is arranged such that when the front installation joint is connected to the engine via the first, second and third links, the third link is a standby design for possible damages and security purpose.

Further preferably the connecting bolt at the fifth connection point is clearance-fitted with the bushing with a second clearance, and the second clearance is greater than the first clearance and set in a way that when the first link or the second link completely fails, the connecting bolt at the fifth connection point partially contacts with the bushing.

When the whole first link or the whole second link completely fails, the second clearance at the fifth connection point partially disappears due to the load of the engine, and the third link participates in receiving a force.

In another embodiment of the present invention, there is included an engine duct auxiliary structure with one end connected to the pylon box segment and the other end adapted to be connected to a nacelle core cowl comprising a core front cowl and a core rear cowl, the engine duct auxiliary structure comprising a front frame hinged with the core front cowl and a rear frame connected with the core rear cowl, the rear frame comprising at least one guide rail for guiding the core rear cowl to enable the core rear cowl to slideably open relative to the pylon box segment.

The integrated design of the engine duct auxiliary structure and pylon box segment may, on the one hand, meet the need of engine-nacelle-pylon box segment integrated design, and on the other hand, provide a narrower structural shape of the engine duct auxiliary structure to substantially increase the area of an engine external duct flow passageway, reduce the engine fuel consumption rate, improve aircraft economics and present a higher market competitiveness.

Preferably, the front frame comprises a front beam, a rear beam, an intermediate cross beam and an intermediate slant beam, wherein one end of the front beam is connected to the pylon box segment, and the other end is connected to the core front cowl; wherein the rear beam is located downstream of the front beam, and one end thereof is connected to the pylon box segment and the other end thereof is connected to the core front cowl; wherein both ends of the intermediate cross beam are respectively connected to the front beam and the rear beam; wherein one end of the intermediate slant beam is connected to the intermediate cross beam, and the other end is inclined towards the rear beam and connected to the pylon box segment; wherein the rear frame extends rearward from the rear beam and its upper end is connected to the pylon box segment.

Further preferably, the rear beam of the front frame is connected to the pylon box segment via a pivoting seat, and the other end of the intermediate slant beam is also connected to the pivoting seat.

Further preferably, the intermediate cross beam is pivoted with a plurality of hinges, and the other end of the plurality of hinges is connected to the core front cowl so that the core front cowl rotatably opens relative to the pylon box segment.

Advantageous effects of the present invention are as follow: the engine thrust reverser cowl is directly connected to the sidewall of the pylon box segment, and the thrust reverser cowl is guided to open via the guide rail on the sidewall, thus a guide rail beam is canceled to thereby not only save space and meet the installation requirement of the LEAP-X model engine, but also reduce the weight of the whole propulsion system.

BRIEF DESCRIPTION OF DRAWINGS

Other features and advantages of the present invention can be made more apparent by the following preferred embodiments described in detail with reference to figures, wherein identical reference numbers denote identical or like parts, wherein.

DETAILED DESCRIPTION OF PREFERRED EMBODIMENTS

Figure 1:
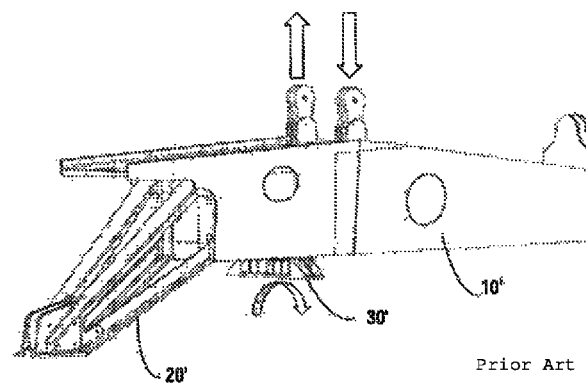
FIG. 1 is a schematic view of an aircraft pylon in a conventional configuration.
Figure 2:
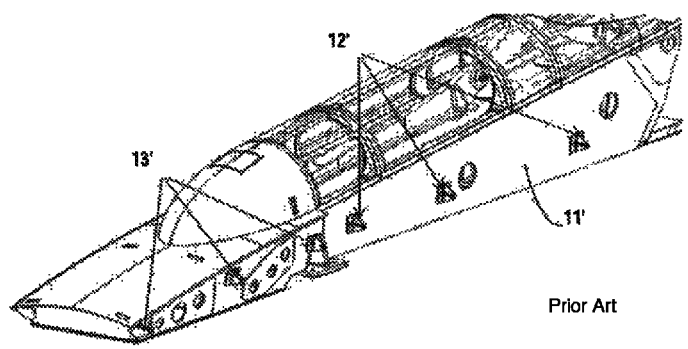
FIG. 2 is a schematic view of a conventional nacelle connector.

Embodiments are described in detail below with reference to figures which constitute part of the description. The figures exemplarily exhibit specific embodiments, and the present invention is implemented in these embodiments. The shown embodiments are not intended to exhaust all embodiments according to the present invention. It may be appreciated that other embodiments may be used, and structural or logical changes can be made without departing from the scope of the present invention. Regarding figures, terms indicative of directions such as "outward" and "downward" are used with reference to orientations of the described figures. If the orientations of the figures change, these terms also change accordingly. Since assemblies of the embodiments of the present invention can be implemented in many orientations, these direction terms are used for illustration purpose not for limitation purpose. Hence, the following specific embodiments are not intended to limit the present invention, and the scope of the present invention is defined by the appended claims.

The internationally advanced LEAP-X engine employs a novel O-DUCT thrust reverser structure, and a thrust reverser body composite material structure cowl body employs integral forming technology. Main advantages are simple maintenance, light weight and easy reduction of noise levels. The fuel consumption of the LEAP-X engine decreases by 116% as compared with that of CFM56 engine of current B737 and A320, and the noise of the LEAP-X engine decreases by over 10 decibels as compared with the internationally most rigorous fourth-level requirement. It is estimated that the propeller integration technology (namely IPS technology) of the present invention achieves 1.5% fuel consumption reduction and 2-decibel noise reduction.

Structurally, the engine is connected to the pylon box segment structure via front and rear installation joints, and an engine core cowl IFS structure is connected to the pylon box segment via a BIFI structure. Additionally, an O-shaped thrust reverser is connected with a sidewall guide rail structure of the pylon box segment, and the whole engine, nacelle and pylon structure wholly bears a force and performs a function of the propulsion system. Therefore, this technology is called propeller integration technology (namely, IPS technology).

Since the integration technology is a brand-nevi technology, and meanwhile the engine, the thrust reverser structure and pylon structure all are distinct from the conventional form, and the IPS pylon needs to be substantially improved to achieve the design targets such as weight reduction, noise reduction, SFC reduction and aerodynamic loss reduction.

The following problems need to be solved from perspective of pylon structure:

(1) Reducing the space of engine duct occupied by the pylon;
(2) Reasonably solving transfer issue of the engine load;
(3) Solving problems related to engine nacelle;
(4) Solving the problem about arrangement of systems in the pylon.

Figure 3:
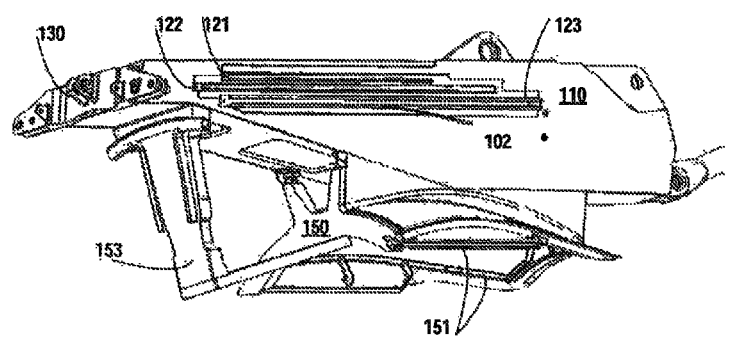
FIG. 3 illustrates an overall schematic view of a pylon structure of an integrated propulsion system according to a preferred embodiment of the present invention.

FIG. 3 illustrates an overall schematic view of a pylon structure of an integrated propulsion system according to a preferred embodiment of the present invention. The pylon structure is adapted to be connected to an aircraft airfoil at one end and connected to an aero-engine at the other end, and the pylon structure comprises a pylon box segment 110 consisting of an upper beam, a lower beam, a frame 100 and a sidewall panel 102; wherein the pylon structure further comprises a thrust reverser cowl connection structure, a front installation joint 130 and an engine duct auxiliary structure 150.

Again as shown in FIG. 3, the thrust reverser connection structure is disposed on the sidewall panel 102 of the pylon box segment 110 and connected with a nacelle thrust reverser cowl comprising a front fixed cowl 301, and a rear movable cowl 302. The thrust reverser connection structure comprises three guide rails: an upper guide rail 121, an intermediate guide rail 122 and a lower guide rail 123. The upper guide rail 121 and the lower guide rail 123 are used to guide the rear moveable cowl 302 to allow the rear movable cowl to open relative to the pylon box segment; and the intermediate guide rail 122 is used to guide a nacelle grid 303. The rear movable cowl 302 is provided with a structure such as a slider that is slideably engaged with the upper guide rail 121 and the lower guide rail 123. Certainly, if the upper guide rail 121 and lower guide rail 123 are configured as a slider, it is also feasible to provide corresponding guide rails on the rear moveable cowl 302.

In the present embodiment, hinges are omitted from the IPS pylon so that the guide rails are directly connected with the pylon. This facilitates reduction of nacelle weight, meanwhile increases nacelle sound absorption area and facilities noise reduction.

Regarding the structural form of the pylon sidewall, panel and guide rails, as compared with the conventional aircraft structure design, the connection form for connecting the pylon with the thrust reverser is changed from a hinge-hinge beam structure to a guide rail-slider structure. This new connection form is advantageous mainly in reducing the weight of the connection structure, increasing an area of sound-absorbing cells of the nacelle and facilitating noise reduction.

The guide rail and the sidewall panel 102 of the pylon are manufactured separately, and the connection manner still employs fastener connection. The fastener connection is described as follows: a fastener is directly mounted on the sidewall panel in two forms: one is that the sidewall panel and the guide rail share the fastener, and the other is that the sidewall panel does not share the fastener with the guide rail. First, positions of the sidewall panel not sharing the fastener are mounted first. These positions generally conflict with the positions of the guide rail, so countersunk screws need to be used upon installation. Then the guide rail is mounted on the sidewall panel. At this time, the fastener shared by the sidewall panel and the guide rail is mounted. This form is advantageous in simplifying part processing, not affecting the arrangement of the fastener due to the position of the guide rail, facilitating the mounting of the fastener on the sidewall panel and ensuring the force transmission of the pylon box segment.

Figure 4A:
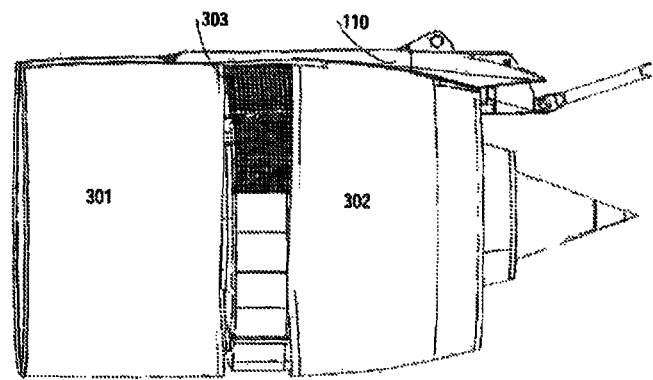
FIG. 4a illustrates an in-use state of an LEAP-X model engine mounted to a pylon structure of an integrated propulsion system according to a preferred embodiment of the present invention, wherein a thrust reverser structure of the LEAP-X model engine is in a normal deployed position.
Figure 4B:
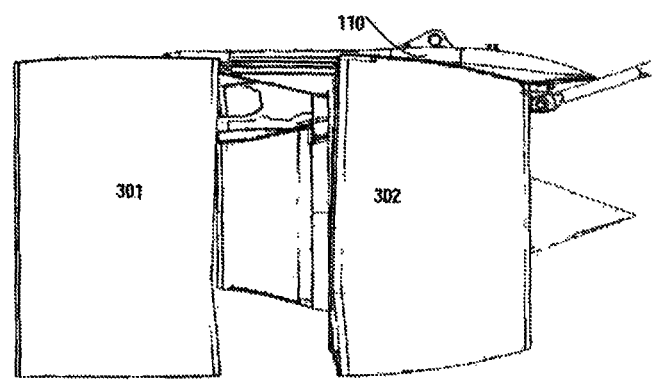
FIG. 4b is a view similar to FIG. 4a, but the thrust reverser structure of the LEAP-X model engine is in a maintenance deployment position, and a grid is removed to clearly show the nacelle.

FIG. 4a illustrates an in-use state of an LEAP-X model engine mounted to a pylon structure of the integrated propulsion system according to a preferred embodiment of the present invention, wherein a thrust reverser structure of the LEAP-X model engine is in a normal deployed position; and FIG. 4b is a view similar to FIG. 4a, but the thrust reverser structure of the LEAP-X model engine is in a maintenance deployment position, and a nacelle grid 303 is removed to clearly show the nacelle. Upon maintenance, the rear movable cowl 302 moves backwards away from the front fixed cowl 301 along the upper guide rail 121 and the lower guide rail 123. It should be appreciated that although there are two guide rails here to guide the rear movable cowl 302, it is feasible to set only one guide rail or a plurality of guide rails according to needs.

A main function of the installation joints of the present invention is to connect the engine and transfer the load of the engine to the pylon structure. A conventional engine installation manner is that the engine is connected with the pylon via the front and rear installation joints, and the torque of the engine is transferred to the aircraft pylon via the rear installation joint, while the present invention, by using integrated design of the front installation joint and the pylon frame, can transfer vertical and lateral load, as well as transfer the torque. The present invention may be used to equip the engine on any type of aircraft.

Figure 5:
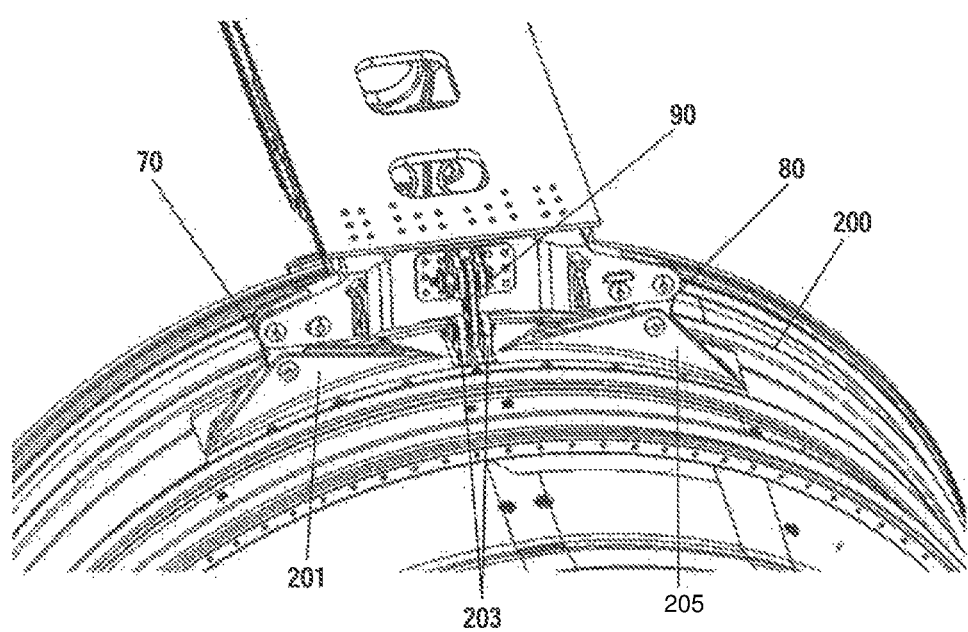
FIG. 5 illustrates an in-use state in which a front installation joint of FIG. 3 is connected to a fan casing of the engine.

In the present embodiment, as shown in FIG. 5, the front installation joint 130 is disposed on a front wall of the front end frame 100 and connected to a first connector 201, a second connector 203 and a third connector 205 on a fan casing 200 of the aero-engine.

Figure 6A:
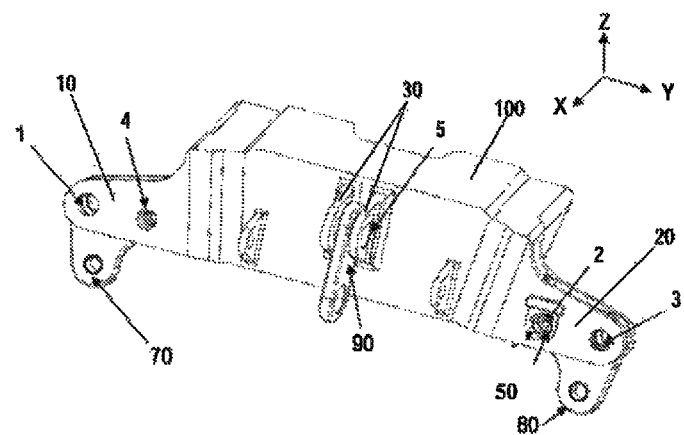
FIG. 6a illustrates a schematic view of the front installation joint of the pylon structure of the integrated propulsion system according to a preferred embodiment of the present invention, wherein a fastener for fixing a boomerang link.

Introduction is presented for a specific design of the front installation joint 130 in the present embodiment. As shown in FIG. 6a, the front installation joint 130 is adapted to be integrally formed with the front end frame 100 of the aircraft pylon and comprises a first lug 10, a second lug 20, a third lug 30, a first link 70, a second link 80, and a third link 90. The first lug 10 and the second lug 20 respectively protrude outward from both sides of the front end frame 100; and the first link 70, the second link 80 and the third link 90 are respectively connected to the first lug 10, the second lug 20 and the third lug 30 at one end, and respectively adapted to be connected to the aero-engine at the other end. In the present embodiment, the first link and the second link are preferably boomerang links and the third link is preferably a straight link, but these links may be links in any other shapes.

Figure 6B:
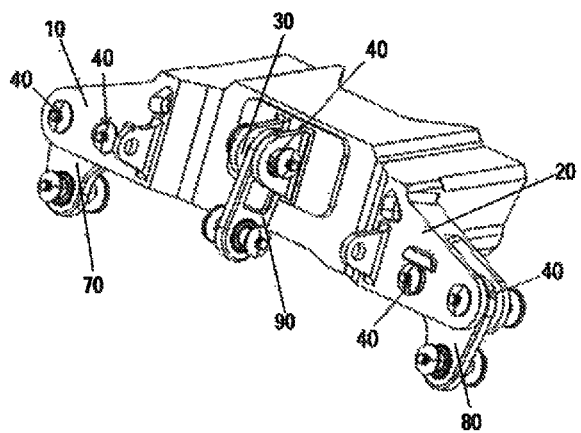
FIG. 6b is a view similar to FIG. 6a, wherein the installation joint is assembled with a fastener.

As shown in FIG. 6b, the first link 70 and the first lug 10 are connected respectively at a first connection point 1 and a fourth connection point 4, the second link 80 and the second lug 20 are connected respectively at a second connection point 2 and a third connection point 3, and the third link 90 and the third lug 30 are connected at a fifth connection point 5. In the present embodiment, the first lug, the second lug and the third lug are preferably a double-lug with a mounting hole which is provided on each lug of the double-lug at the respective connection points. A bushing 50 is mounted in each mounting hole, and a bolt hole is formed on each link at each connection point. One connecting bolt 40 is mounted on a corresponding link respectively at the first through fifth connection points 1, 2, 3, 4, 5 and runs through the bushing 50 in the mounting hole on the corresponding lugs through these connection points.

Figure 7:
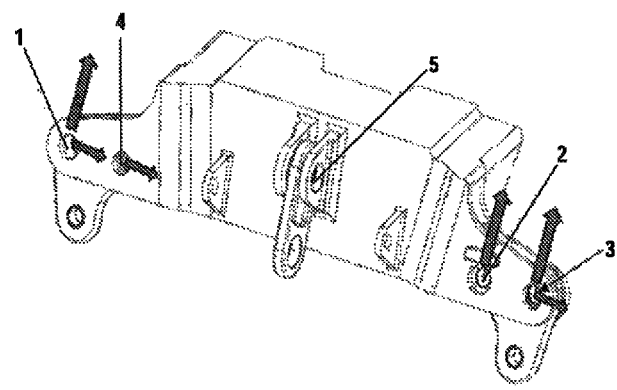
FIG. 7 is a schematic view showing reception of force of the front installation joint of FIG. 6a in a normal state.

Again as shown in FIG. 5, the front installation joint of the present embodiment is connected to the first connector 201, the second connector 203 and the third connector 205 on the engine fan casing 200 via the two boomerang links and one straight link, and the whole front installation joint and the engine have totally three connection point. The fourth connection point 4 on the first link 70 and the third link 90 are standby designs for possible damages and security purpose. That is to say, in normal working conditions, as shown in FIG. 7 and with reference to FIG. 6a, the three connection points, the first connection point 1, the second connection point 2 and the third connection point 3, jointly bear a vertical load (Z direction) and a course torque (X direction) transferred from the engine, and the first connection point 1 and the third connection point 3 bears a lateral load (Y direction). When any one of the first connection point 1, the second connection point 2 and the third connection point 3 fails, the fourth connection point 4 participates in bearing the vertical load (Z direction) and lateral load (V direction). For example, when the second connection point 2 fails, the first connection point 1, the fourth connection point 4 and the third connection point 3 jointly bear the vertical load (Z direction), lateral load (Y direction) and course torque (X direction) transferred from the engine. When the whole first link 70 or the Whole second link 80 fails, i.e., both of its connection points fail, for example, when the second link 80 completely fails, the third link 90 will participate in receiving a force, and the first connection point 1, the fourth connection point 4 and the fifth connection point 5 jointly bear the vertical load (Z direction), the lateral load (V direction) and engine torque transferred from the engine.

Again as shown in FIG. 7, in the connection points where the first link 70 and the second link 80 are respectively connected to the first lug 10 and the third lug 30, the connecting bolt is transition-fitted with the bushing at the first connection point 1, the second connection point 2 and the third connection point 3 so that under normal working conditions, the three connection points bear all loads and torques.

Figure 8:
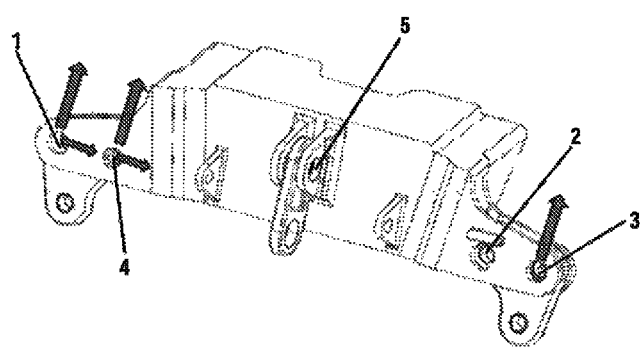
FIG. 8 is a schematic view showing reception of force of the front installation joint of FIG. 6a in a state that a second connection point fails.
Figure 9:
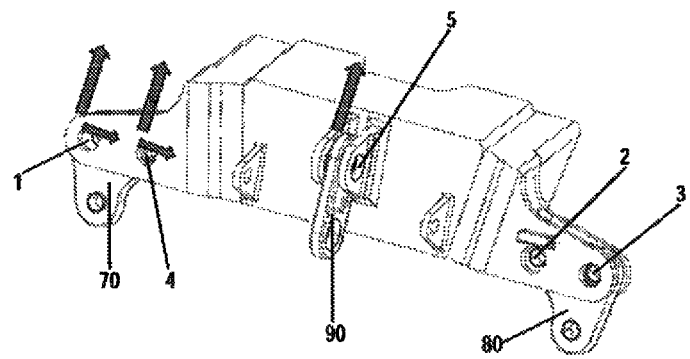
FIG. 9 is a schematic view showing reception of force of the front installation joint of FIG. 6a, in a state that a second boomerang link fails.

To allow the first link 70 and the third link 90 to be standby designs for possible damages and security purpose, and the first link 70 to be a preferable standby design for possible damages and security purpose, i.e., preferably act before the third link 90 acts, the connecting bolt 40 is clearance-fitted with the bushing at the fourth connection point 4, and the connecting bolt 40 is also clearance-fitted with the bushing at the fifth connection point 5, but the clearance at the fifth connection point 5 is slightly greater than the clearance at the fourth connection point 4. Therefore, as shown in FIG. 8, when any one of the connection points 1, 2 and 3 fails, for example, when the second connection point 2 fails, due to the load of the engine, the front end frame 100 of the pylon slightly rotates with connecting bolt 40 at the third connection point 3 as a rotation shaft so that the connecting bolt 40 at the fourth connection point 4 partially contacts with the bushing, i.e., the clearance between the connecting bolt 20 and the bushing partially disappears at the fourth connection point 4, and the fourth connection point 4 begins to participate in receiving the force, and the connection points 1, 4 and 3 bear the vertical load, lateral load and the course torque. When the whole first link 70 or the whole second link 80 completely fails, for example, when the second link 80 completely fails, as shown in FIG. 8, due to the load of the engine, the third link 90 is pulled downward so that the connecting bolt 20 at the fifth connection point 5 partially contacts with the bushing, i.e., this partial clearance disappear, such that the third link 90 participates in receiving the force, and the connection points 1, 4 and 5 bear the vertical load, lateral load and the course torque.

In the embodiment as shown in FIG. 5 through FIG. 9, the first connection point 1, the fourth connection point 4, the second connection point 2 and the third connection point 3 are preferably arranged in a straight line so that reverse vectors in the straight line direction offset each other. Furthermore, preferably the fourth connection point 4 and the second connection point 2 are arranged opposite to each other and respectively located inside the first connection point 1 and the third connection point 3. Besides, although in the present embodiment, the fifth connection point 5 is vertically (namely Z direction) located above other connection points 1, 2, 3 and 4 and located at an intermediate position of other connection points in a lateral direction (namely, Z direction). It should be appreciated that the fifth connection point 5 may be vertically located below other positions such as connection points 1, 2, 3 and 4 so long as the third link 9 does not receive the force after the front installation joint is connected to the engine.

Figure 10:
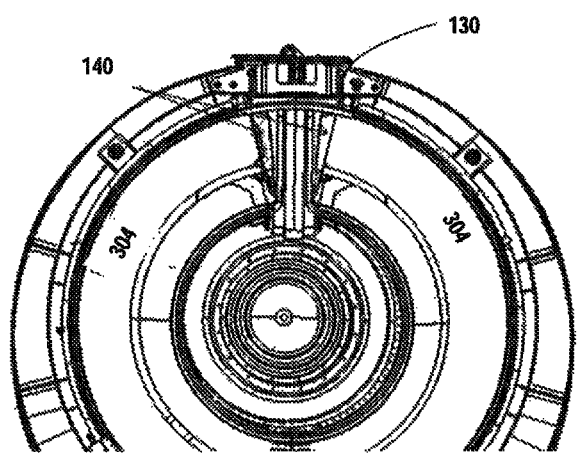
FIG. 10 illustrates space of the engine duct occupied by a pylon box segment of the pylon structure of the integrated propulsion system according to a preferred embodiment of the present invention.

As compared with the prior art, the front installation joint in the above embodiment has the following advantages:
1) the front installation joint of the engine is integral with the pylon frame, omitting a mounting bracket, namely, omitting a docking form, so that the installation joint is directly connected to the engine fan casing via a link, thereby reducing the weight of a mounting portion of the engine;
2) the installation joint not only bears the load in the vertical direction and horizontal direction, but also bears the engine torque, thereby releasing a torque-bearing function of the rear installation joint;
3) since the front installation joint 130 bears the torque, the width of the shape of the rear installation joint is reduced, and an engine external duct space 304 occupied by the pylon is reduced as shown in FIG. 10, which facilitates reduction of fuel consumption rate, facilitates retraction of a rear edge 140 of the pylon and achieves reduction of aerodynamic loss; and
4) the design of the first link and the third link enables the whole front installation joint to have a function of standby design for possible damages and security purpose.

Figure 11:
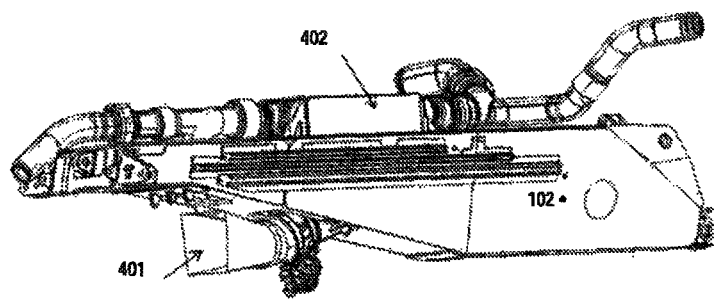
FIG. 11 illustrates a mounting position of a fan air valve in the pylon structure of the integrated propulsion system according to a preferred embodiment of the present invention.

As shown in FIG. 11, since a duct separation surface is apparently narrower than a conventional pylon, a fan air valve (namely, FAV) 401 is arranged in the engine duct auxiliary structure (namely, BIFI) 150 not in the pylon box segment 110. Meanwhile, since the BIFI is an auxiliary structure, a skin may be made as a detachable skin. As such, it is feasible to take out the FAV without removing the pre-cooler 402, thereby improving FAV maintenance performance and reducing the maintenance cost.

Figure 12A:
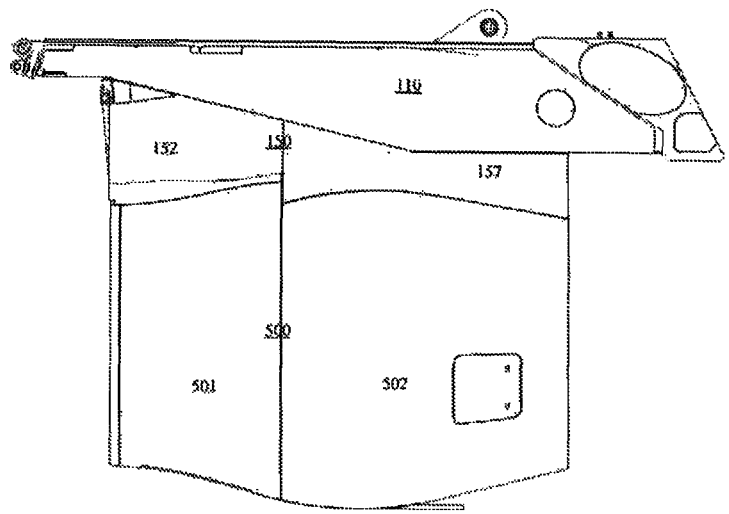
FIG. 12a illustrates a schematic view in which the pylon structure of the integrated propulsion system according to a preferred embodiment of the present invention is connected with the LEAP-X engine nacelle, wherein a nacelle core cowl is in a normal use state, and a thrust reverser cowl connection structure is removed from a pylon side panel for the sake of clarity.
Figure 12B:
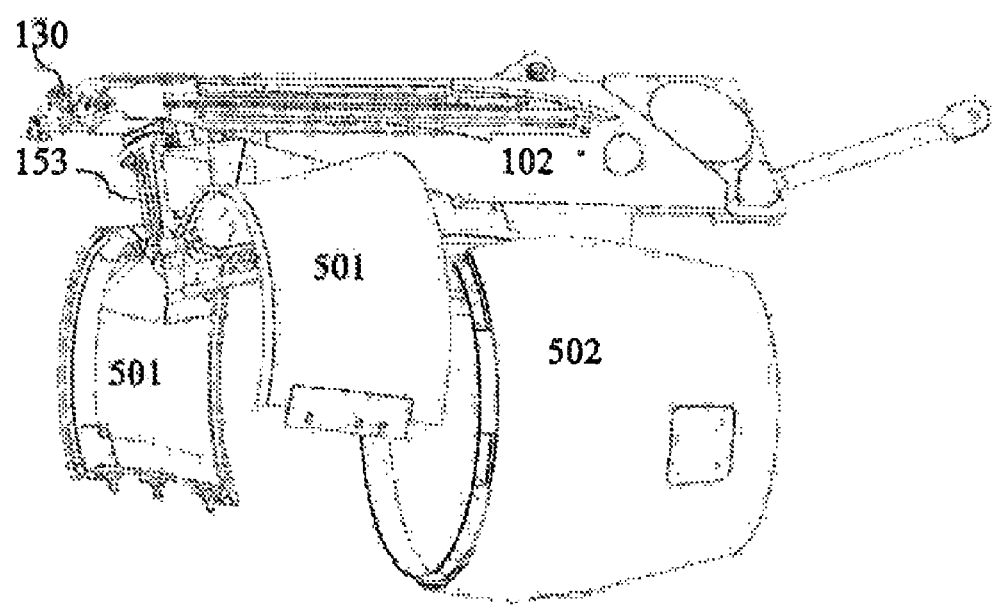
FIG. 12b is similar to FIG. 12a, but the nacelle core cowl is in a maintenance use position.

As shown in FIG. 12a and FIG. 12b, a nacelle core cowl of a nacelle 500 of the LEAP-X engine comprises a core front cowl 501 and a core rear cowl 502, wherein the core rear cowl 502 needs to be opened by sliding rearward. To meet the need of the core rear cowl 502, in the present embodiment, BIFI structure no longer serves as part of the nacelle thrust reverser structure as in the conventional BIFI structure, it is integrally arranged with the pylon box segment 110, i.e. it is suspended below the pylon box segment 110 and provides a guide rail 151 to guide the core rear cowl to slideably open thereon. The BIFI is located between an inner surface of the rear moveable cowl 302 of the nacelle thrust reverser structure and the core rear cowl 502 of the nacelle core cowl, and its surface serves as an airflow separation surface of the engine external duct, so it needs to be designed narrower.

Figure 13:
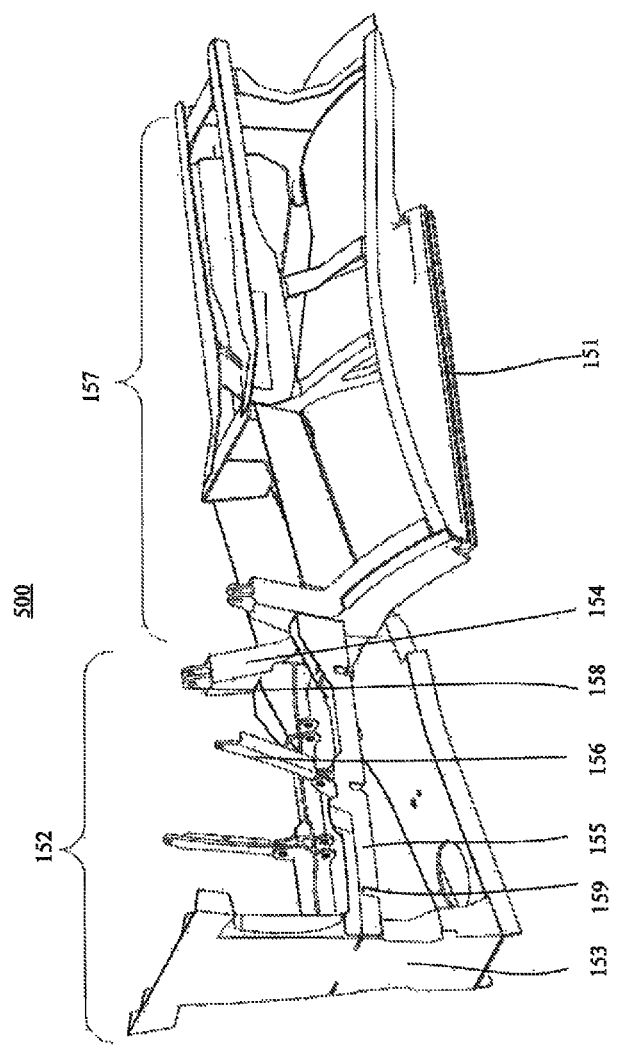
FIG. 13 illustrates main structures of the engine duct auxiliary structure of FIG. 3.

As shown in FIG. 13 and with reference to FIG. 12a, there is an engine duct auxiliary structure 150 for connecting the nacelle 500 with the pylon box segment 110, comprising: a front frame 152 comprising a front beam 153 (usually called front end wall), a rear beam 154, an intermediate cross beam 155 and an intermediate slant beam 156; wherein one end of the front beam 153 is connected to the pylon box segment 110, and the other end is connected to a core front cowl 501 of the nacelle 500. The rear beam 154 is arranged in the rear of the front beam 153, and one end thereof is connected to the pylon box segment 110 and the other end thereof is connected to the core front cowl 501 of the nacelle 500. Both ends of the intermediate cross beam 155 are respectively connected to the front beam 153 and the rear beam 154. One end of two intermediate slant beams 156 is connected to the intermediate cross beam 155, and the other end is inclined towards the rear beam 154 and connected to the pylon box segment 110. A rear frame 157 extends rearward from the rear beam 154 and its upper end is connected to the pylon box segment 110, and the rear frame 157 is provided with at least one guide rail 151 for guiding the core rear cowl 502 of the nacelle 500. Those skilled in the art may understand that the number of the guide rail 151 is preferably two.

Specifically, the rear beam 154 of the front frame 152 is connected to the pylon box segment 110 via a pivoting seat 158, and the other end of the intermediate slant beam 156 is also connected to the pivoting seat 158.

The intermediate cross beam 155 is pivoted to the core front cowl 501 of the nacelle 500 via a plurality of hinges (which are not shown, and may be provided at a connection position 159 as shown).

Both sides of the front beam 153 of the engine duct auxiliary structure 150 are connected to the pylon box segment 110 to transfer the course load and the vertical load, and a connecting portion (e.g., a single lug) extending out of the pylon box segment 110 keeps a gap on both sides upon being connected thereto so that it does not transfer lateral load; and an intermediate shear pin leaves a gap in the front and in the rear to allow it to only transfer the lateral load.

The core front cowl 501 of the nacelle 500 may be connected to the engine duct auxiliary structure 150 via a hinge, which ensures rotatable opening of the core front cowl 501. The guide rail 151 is used to connect a connection interface of the core rear cowl 502 of the nacelle 500, which ensures slideable opening of the core rear cowl. Use of the guide rail 151 may ensure that the core rear cowl 502 may be opened rearward, and an O-shaped thrust reverser of the pylon box segment 110 can also be achieved, which facilitates implementation of the pylon box segment 110. The engine duct auxiliary structure 150 is narrower, which is directly conducive to the saving of the fuel, since the engine duct auxiliary structure 150 is a structure in the engine external duct.

In the structure shown in FIG. 13, the front frame 152 of the engine duct auxiliary structure 150 is connected to a main structure of the pylon box segment 110 in a lug-connector connection manner, and the rear frame 157 is connected to the main structure of the pylon box segment 110 in a surface connection manner. However, it may be appreciated that the engine duct auxiliary structure 150 is connected to the main structure of the pylon box segment 110 in a detachable connection manner, e.g., a hinge or a hinged support. The hinged supports of the pylon box segment 110 and the rear frame 157 are pivoted together via two ends of a pivoting rod, and meanwhile, hinges of the pylon box segment 110 and the rear frame 157 may also be pivoted to each other via a pin-shaped fastener. As such, both the front frame 152 and the rear frame 157 are both upwardly pivoted to the pylon box segment 110, and the front frame 152 is connected to the core rear cowl 501. That is to say, joints at respective locations are not fixed connections and all are detachable, thereby achieving excellent maintainability.

The engine duct auxiliary structure 150 is apparently narrower than the conventional pylon, which allows the LEAP-X engine duct to have better aerodynamic properties and reduces engine fuel consumption (about 0.75% as estimated). It is a part of the pylon structure, and the BIFI structure is not a main force-bearing structure but a second-level structure relative to the pylon box segment 110.

The technical contents and technical features of specific embodiments of the present invention are already revealed as above. However, it should be appreciated that as guided by the creation idea of the present invention, those skilled in the art can make various modifications and improvements to the above-disclosed various features and combinations of features not explicitly shown here, but these variations and/or combinations all fall within the protection scope of the present invention. The above depictions of embodiments are only exemplary not restrictive.

| Reference signs: | |
|---|---|
| 10' pylon | 11' pylon sidewall |
| 12' thrust reverser cowl hinge | 13' fan cowl hinge |
| 20' front installation joint | 30' rear installation joint |
| 1 first connection point | 2 second connection point |
| 3 third connection point | 4 fourth connection point |
| 5 fifth connection point | |
| 10 first lug | 20 second lug |
| 30 third lug | 40 connecting bolt |
| 50 bushing | |
| 70 first link | 80 second link |
| 90 third link | |
| 110 pylon box segment | |
| 100 front end frame | 102 side panel |
| 121 upper guide rail | 122 intermediate guide rail |
| 123 lower guide rail | 130 front installation joint |
| 140 pylon rear edge | 150 engine duct auxiliary structure |
| 151 guide rail | 152 front frame |
| 153 front beam | 154 rear beam |
| 155 intermediate cross beam | 156 intermediate slant beam |
| 157 rear frame | 158 pivoting seat |
| 159 connection position | |
| 200 engine fan casing | |

| Reference signs: | |
|---|---|
| 201 first connector | 203 second connector |
| 205 third connector | |
| 301 front fixed cowl | 302 rear moveable cowl |
| 303 nacelle grid | 304 engine external duct space |
| 401 fan air valve | 402 precooler |
| 500 nacelle | |
| 501 core front cowl | 502 core rear cowl |

What is claimed is:

1. A pylon structure of an integrated propulsion system, which is adapted to be connected to an aircraft airfoil at one end and connected at the other end to an aero-engine having a fan casing, the pylon structure comprising:
   a pylon box segment including an upper beam, a lower beam, a frame and a sidewall panel, wherein the pylon structure further includes:
   a thrust reverser cowl connection structure disposed on the sidewall panel and connected to a nacelle thrust reverser cowl that includes a front fixed cowl and a rear moveable cowl, the thrust reverser cowl connection structure including at least one guide rail for guiding the rear moveable cowl to enable the rear moveable cowl to slideably open relative to the pylon box segment;
   wherein the frame includes a front end frame that includes a front wall, wherein the pylon structure further includes a front installation joint disposed on the front wall of the front end frame of the frame and connected to the fan casing of the aero-engine;
   wherein the front installation joint includes:
   a first lug and a second lug respectively protruding outward from a respective one of two opposite sides of the front end frame; and
   a first link and a second link respectively connected to the first lug and the second lug at one end, and respectively adapted to be connected to the aero-engine at the other end;
   wherein the first link and the first lug are pivotally connected at a first connection point, and the second link and the second lug are connected respectively at a second connection point and a third connection point;
   wherein the first link is further connected to the first lug at a fourth connection point, and the fourth connection point and the second connection point are arranged opposite to each other and respectively located inside the first connection point and the third connection point, wherein a connecting bolt running through the first link at the fourth connection point is clearance-fitted with a bushing disposed in a mounting hole of the first lug at the fourth connection point and wherein the connecting bolt at the fourth connection point is clearance-fitted with the bushing with a first clearance, and the first clearance is set in a way that when any one of the first connection point, the second connection point and the third connection point fails, the connecting bolt at the fourth connection point partially contacts with the bushing;
   wherein the pylon structure further comprises a third lug defining a mounting hole and protruding outward from a front wall of the front end frame, and a third link having one end connected to the third lug at a fifth connection point and the other end adapted to be connected to the engine, and a connecting bolt running through the third link at the fifth connection point is clearance-fitted with a bushing disposed in the mounting hole of the third lug at the fifth connection point;
wherein the connecting bolt at the fifth connection point is clearance-fitted with the bushing with a second clearance, and the second clearance is greater than the first clearance and is set in a way that when the first link or the second link completely fails, the connecting bolt at the fifth connection point partially contacts with the bushing.

2. The pylon structure of an integrated propulsion system according to claim 1, wherein the thrust reverser cowl connection structure includes an upper guide rail and a lower guide rail for guiding the rear movable cowl and an intermediate guide rail for guiding a nacelle grid.

3. The pylon structure of an integrated propulsion system according to claim 2, wherein the rear movable cowl is provided with a structure slideably engaged with the upper guide rail and the lower guide rail.

4. The pylon structure of an integrated propulsion system according to claim 1, wherein a mounting hole is defined in each of the first lug and the second lug and wherein connecting bolts running through the first link and the second link respectively at the first connection point, the second connection point and the third connection point are transition-fitted with bushings disposed at these connection points and formed in the respective mounting hole of the first lug and the second lug.

5. The pylon structure of an integrated propulsion system according to claim 1, wherein the pylon structure further comprises an engine duct auxiliary structure with one end connected to the pylon box segment and the other end adapted to be connected to a nacelle core cowl that includes a core front cowl and a core rear cowl, the engine duct auxiliary structure including a front frame hinged with the core front cowl and a rear frame connected with the core rear cowl, the rear frame being provided with at least one guide rail for guiding the core rear cowl to enable the core rear cowl to slideably open relative to the pylon box segment.

6. The pylon structure of an integrated propulsion system according to claim 5, wherein the front frame includes a front beam, a rear beam, an intermediate cross beam and an intermediate slant beam, wherein one end of the front beam is connected to the pylon box segment, and the other end is connected to the core front cowl; wherein the rear beam is located downstream of the front beam, and one end thereof is connected to the pylon box segment and the other end thereof is connected to the core front cowl; wherein both ends of the intermediate cross beam are respectively connected to the front beam and the rear beam; wherein one end of the intermediate slant beam is connected to the intermediate cross beam and the other end is inclined towards the rear beam and connected to the pylon box segment; and
wherein the rear frame extends rearward from the rear beam and its upper end is connected to the pylon box segment.

7. The pylon structure of an integrated propulsion system according to claim 6, wherein the rear beam of the front frame is connected to the pylon box segment via a pivoting seat, and the other end of the intermediate slant beam is also connected to the pivoting seat.

8. The pylon structure of an integrated propulsion system according to claim 7, wherein the pylon structure further comprises a plurality of hinges having one end pivoted with the intermediate cross beam and the other end connected to the core front cowl so that the core front cowl rotatably opens relative to the pylon box segment.

9. The pylon structure of an integrated propulsion system according to claim 5, further comprising a fan air valve arranged in the engine duct auxiliary structure.

* * * * *